H. W. HAYDEN.
Lantern.
No. 206,729. Patented Aug. 6, 1878.
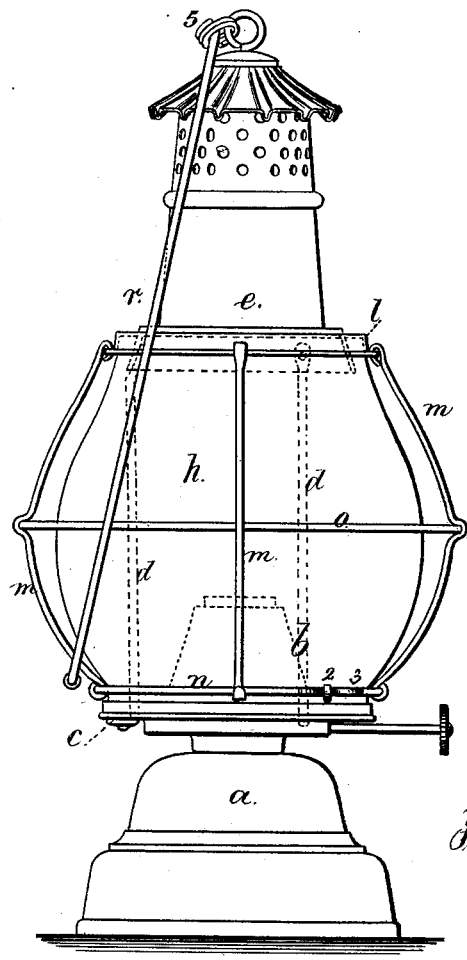
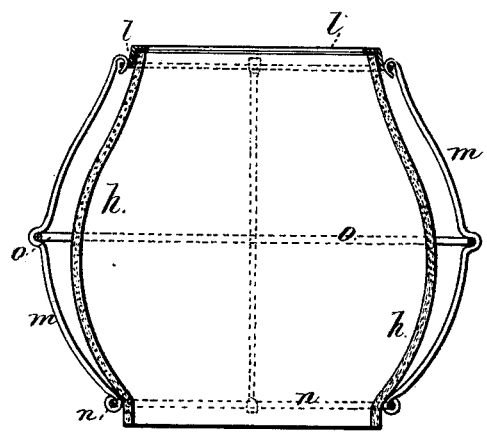
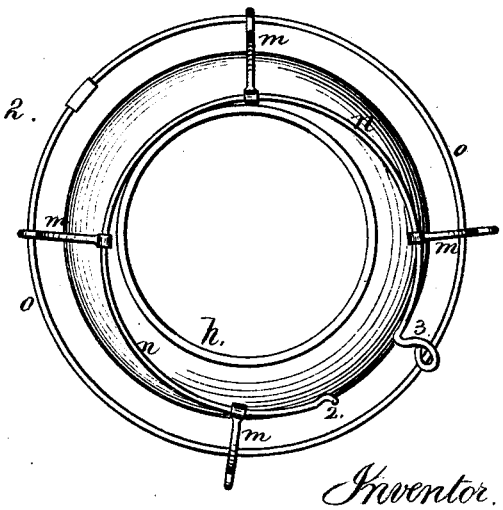
Witnesses
Chas H Smith
Geo. T. Pinckney
Inventor
Hiram W. Hayden
per Lemuel W. Serrell
atty

UNITED STATES PATENT OFFICE.

HIRAM W. HAYDEN, OF WATERBURY, CONNECTICUT, ASSIGNOR TO HOLMES, BOOTH & HAYDENS, OF SAME PLACE.

IMPROVEMENT IN LANTERNS.

Specification forming part of Letters Patent No. 206,729, dated August 6, 1878; application filed June 20, 1878.

*To all whom it may concern:*

Be it known that I, HIRAM W. HAYDEN, of Waterbury, in the county of New Haven and State of Connecticut, have invented an Improvement in Lanterns, of which the following is a specification:

Lamps and lanterns have been made with a metallic top that is connected with the air-distributer of the burner by wires, as may be seen in Letters Patent No. 40,890, the glass chimney or globe being outside the wires and metal top.

Lanterns have also been made with metal guards of various sizes and characters surrounding the glass to protect the same from injury.

In lanterns that are made with the glass or globe removable upwardly outside of the metallic top of the lantern the metallic guard for the glass could not be attached to the other metal portions of the lantern without interfering with the removability of the glass.

My invention relates to the combination, with the glass or globe of the lantern, (that is removable upwardly and outside of the top,) of a metallic guard that is connected with the glass itself of the lantern by means of a metal ring at the top and a band at the lower end of the glass.

In the drawing, Figure 1 is an elevation of the lantern. Fig. 2 is an inverted plan of the glass-guard as separated from the glass, and Fig. 3 is a section of the chimney and guard.

The oil holder or reservoir $a$, burner $b$, and perforated plate or air-distributer at $c$ are of the ordinary character, and from the plate $c$ the wires $d$ rise and are attached to the metal top $e$, as in said Patent No. 40,890, and the metal top is perforated to allow of the escape of the products of combustion, and provided with a suspending device, as usual in lanterns.

The glass $h$ is of a suitable shape and of a size to slide down outside the metal top $e$. A metal ring, $l$, preferably of sheet metal, is provided, the same being of a size to fit the top of the removable glass $h$, and from this the wires $m$ extend downwardly to the band $n$ at the lower part of the glass, thereby forming a guard to the glass, and there is, by preference, a central hoop, $o$, to the said guard.

The guard may be permanently connected with the removable glass; but in order to facilitate the cleaning of the glass, I construct the guard removably and make the band $n$ expansible, so that the guard can be removed endwise from the glass, the expansible band $n$ distending as it passes over the central enlargement or globe of the glass. I have made use of a wire helix to form this expansible band $n$; but I prefer to use spring-wire, shown in the drawing with reverse-hooks 2 and 3, that are interlocked and hold the band and the lower ends of the guard-wires around the glass; or the said band $n$ may be unhooked and expanded when the glass is drawn out from between the wires of the guard.

Lanterns frequently have a large bail or hoop for suspending them, and if this bail is permanently connected to the top of the lantern the removable glass aforesaid cannot be taken off the lantern by moving it upwardly, because the bail is larger than the opening through the glass.

To allow of the glass being taken off, I attach the bail $r$ removably to the top of the lantern by a split ring, 5, or a snap-hook or equivalent connection, that allows the bail to be removed before taking the glass off the lantern, and allows for the easy reconnection of the bail to the lantern.

I am aware that guards in lanterns have been made with spring-rings, that serve to hold the guard in place; but such spring-rings were not hooked together after being put into place, and a hook has been applied to the center ring of the guard; but the same does not come into contact with the glass.

I claim as my invention—

1. In combination with a lantern-glass that is removable upwardly outside the top, the metal ring $l$, fitting the upper end of the glass, the wires $m$, forming the guard, and the band $n$ around the lower end of the glass, substantially as set forth.

2. In a guard for the removable glass of a lantern, the band n with the interlocking hooks 2 and 3, that secure the guard around the lower part of the glass, substantially as set forth.

3. The combination, in a lantern, of a glass removable upwardly outside of the metal top portion e of the lantern, a bail or supporting-ring, and a connection between the top of the lantern and the bail, that allows the bail to be separated from the lantern previous to the removal of the glass, as set forth.

Signed by me this 10th day of June, A. D. 1878.

H. W. HAYDEN.

Witnesses:
   GEO. E. TERRY,
   C. B. ATWOOD.